(12) United States Patent
Bhansali et al.

(10) Patent No.: US 8,910,124 B1
(45) Date of Patent: Dec. 9, 2014

(54) LOW-OVERHEAD METHOD AND APPARATUS FOR COLLECTING FUNCTION CALL TRACE DATA

(75) Inventors: Sanjay Bhansali, Palo Alto, CA (US); Harshit Chopra, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 98 days.

(21) Appl. No.: 13/285,438

(22) Filed: Oct. 31, 2011

(51) Int. Cl.
*G06F 9/44* (2006.01)

(52) U.S. Cl.
USPC .......................... 717/128; 717/127; 717/130

(58) Field of Classification Search
None
See application file for complete search history.

(56) References Cited

U.S. PATENT DOCUMENTS

| | | | |
|---|---|---|---|
| 6,167,358 A | 12/2000 | Othmer et al. | |
| 6,289,448 B1 * | 9/2001 | Marsland | 713/2 |
| 6,760,903 B1 * | 7/2004 | Morshed et al. | 717/130 |
| 6,971,092 B1 * | 11/2005 | Chilimbi | 717/158 |
| 7,080,283 B1 * | 7/2006 | Songer et al. | 714/30 |
| 7,137,105 B2 * | 11/2006 | Madsen et al. | 717/128 |
| 7,251,810 B1 * | 7/2007 | Nolte | 717/130 |
| 7,353,505 B2 * | 4/2008 | O'Dowd | 717/158 |
| 7,614,044 B2 * | 11/2009 | Bhansali et al. | 717/145 |
| 7,840,950 B2 * | 11/2010 | Stoodley et al. | 717/151 |
| 8,261,244 B2 * | 9/2012 | Pietrek | 717/130 |
| 8,418,145 B2 * | 4/2013 | Cirne et al. | 717/128 |
| 2002/0049962 A1 | 4/2002 | Kelbaugh et al. | |
| 2002/0087842 A1 * | 7/2002 | Smith | 712/227 |
| 2002/0199172 A1 * | 12/2002 | Bunnell | 717/128 |
| 2003/0004671 A1 * | 1/2003 | Minematsu | 702/123 |
| 2004/0003027 A1 | 1/2004 | Rolling et al. | |
| 2004/0143830 A1 | 7/2004 | Gupton et al. | |
| 2005/0149805 A1 | 7/2005 | Syed et al. | |
| 2007/0226720 A1 * | 9/2007 | Chen et al. | 717/151 |
| 2008/0126828 A1 * | 5/2008 | Girouard et al. | 714/2 |
| 2008/0281988 A1 * | 11/2008 | Peck et al. | 710/1 |
| 2009/0037887 A1 * | 2/2009 | Chavan | 717/128 |
| 2011/0022821 A1 * | 1/2011 | Fei et al. | 712/32 |
| 2012/0066480 A1 * | 3/2012 | Hanaki et al. | 712/206 |
| 2013/0091387 A1 * | 4/2013 | Bohnet et al. | 714/38.1 |

OTHER PUBLICATIONS

Non-Final Office Action for related matter mailed Oct. 16, 2013. U.S. Appl. No. 13/170,841, filed Jun. 28, 2011.
Final Office Action for related matter mailed Dec. 19, 2013. U.S. Appl. No. 13/170,841, filed Jun. 28, 2011.
Final Office Action for related matter mailed Dec. 10, 2013. U.S. Appl. No. 13/415,316, filed Mar. 8, 2012.

* cited by examiner

*Primary Examiner* — Isaac T Tecklu
*Assistant Examiner* — Hossain Morshed
(74) *Attorney, Agent, or Firm* — Young Basile Hanlon & MacFarlane P.C.

(57) ABSTRACT

An apparatus and method for aiding in debugging and optimizing software is presented, in particular for instrumenting software to trace function calls. Source code is compiled with placeholder memory ranges. While executing the compiled binary object, a call-trace profiling function is inserted into at least certain of the placeholder memory ranges to log call-trace profiling data. Then, the compiled binary object is restored to its original state by removing the call-trace profiling function(s). A NOP function can be inserted in each placeholder memory range during compilation.

16 Claims, 3 Drawing Sheets

FUNCTION_A:

| ADDR1 | MOV A, CONST |
| --- | --- |
| ... | |
| ADDRN | RET |
| | |

FUNCTION_A:

| ADDR1 | NOP |
| --- | --- |
| ADDR1+k1 | MOV A, CONST |
| ... | |
| ADDRN | RET |
| ADDRN+k2 | NOP |

FUNCTION_A:

| ADDR1 | CALL TRACE_PROF_ENTRY |
| --- | --- |
| ADDR1+k1 | MOV A, CONST |
| ... | |
| ADDRN | JMP TRACE_PROF_EXIT |

LOW-OVERHEAD METHOD AND APPARATUS FOR COLLECTING FUNCTION CALL TRACE DATA

TECHNICAL FIELD

The present invention relates in general to software development tools. More specifically, it relates to a low-overhead method and apparatus for collecting function call trace data that aids in debugging and optimizing software.

BACKGROUND

Development of reliable, efficient software is aided by tools designed to aid in debugging and optimizing the software. Modern software products range from smaller applications that might run on a single computer to larger, more complex applications that operate across multiple computers connected by local area networks (LANs) or wide area networks (WANs) such as the Internet. Software developers use a variety of tools to assist in the development process, from pre-processors that analyze source code for potential issues and compilers that optimize code and organize symbolic information to runtime debuggers that use the symbolic information to assist developers in verifying the correct operation of the software.

SUMMARY

Disclosed herein are embodiments of methods and apparatuses for debugging and optimizing software. One aspect of the disclosed embodiments is a method for on-demand call-trace profiling an application having source code to be executed on a system. This method comprises compiling a binary object from the source code using a processor while including a plurality of placeholder memory ranges in the compiled binary object, each placeholder memory range being of a size suitable for inserting a call-trace profiling function call. The method also includes providing a set of code modification instructions configured to modify the compiled binary object while it is being executed, the instructions including inserting a call-trace profiling function call in at least one of the plurality of placeholder memory ranges, logging call-trace profiling data using the inserted call-trace profiling function call and removing the inserted call-trace profiling function call after logging the call-trace profiling data.

Another aspect of the disclosed embodiments is a method of on-demand call-trace profiling an application having source code to be executed on a system that comprises inserting a call-trace profiling function call in at least one of a plurality of placeholder memory ranges included in a compiled binary object while executing the compiled binary object, the compiled binary object compiled from the source code and stored in a memory and each placeholder memory range being of a size suitable for the inserted call-trace profiling function call. The method also includes logging call-trace profiling data using the inserted call-trace profiling function call and removing the inserted call-trace profiling function call after logging the call-trace profiling data.

Another aspect of the disclosed embodiments is an apparatus for on-demand call-trace profiling of an application having source code to be executed on a system. The apparatus comprises a memory and a processor configured to execute instructions stored in the memory. The instructions insert a call-trace profiling function call in at least one of a plurality of placeholder memory ranges included in a compiled binary object while executing the compiled binary object, the compiled binary object compiled from the source code and stored in a memory and each placeholder memory range being of a size suitable for the inserted call-trace profiling function call, log call-trace profiling data using the inserted call-trace profiling function call, and remove the inserted call-trace profiling function call after logging the call-trace profiling data.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4A is a segment of a compiled binary object that shows memory locations with exemplary assembly language instructions;

FIG. 4B is a segment of a compiled binary object compiled according to an aspect of the invention including NOP instructions; and FIG. 4C is a segment of the compiled binary object of FIG. 4B following substitution of call trace profiling instructions for the NOP instructions.

DETAILED DESCRIPTION

Figure 1:
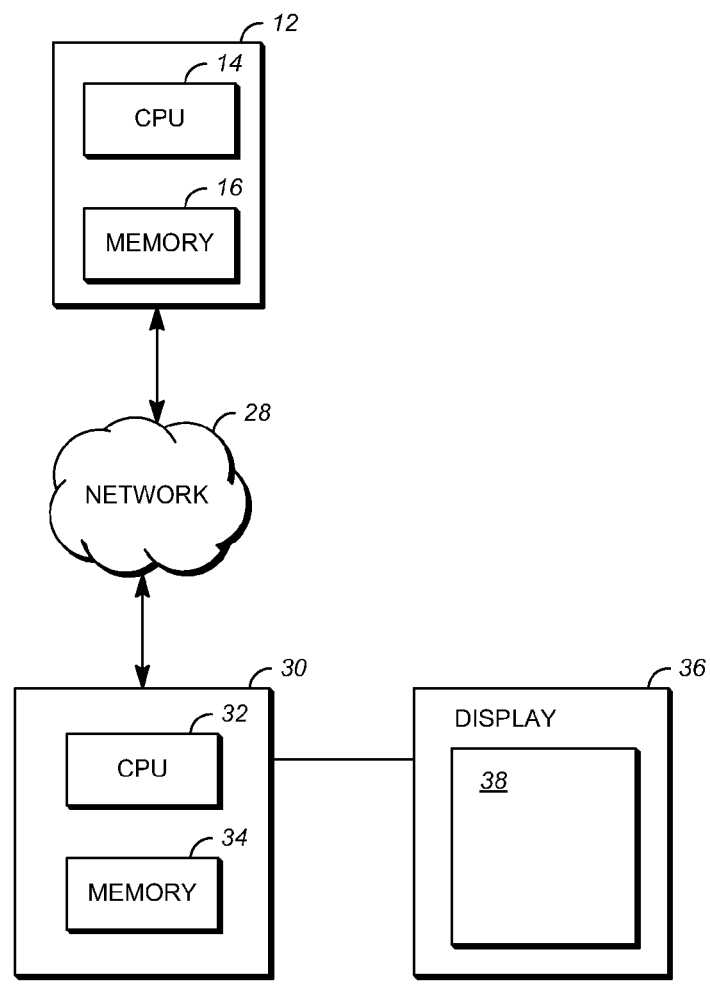
FIG. 1 is a schematic of a computer system in which embodiments of the invention can be incorporated.

Various methods have been used to assist in debugging and optimizing software. Symbolic debuggers typically link symbols and locations found in the source code and then insert instructions in the code to trap execution by generating a breakpoint that transfers control to execute debugging code each time the symbol or location is accessed. This enables software developers to view the results of executing code while the code is running in order to find software bugs (flaws) or to optimize operations. Further, debugging systems also often insert branch instructions in the inline code to branch to a routine that tests to see if the information related to operations should be saved. Even if this test is omitted or no data is to be saved responsive to the test, the overhead introduced is generally large enough that the real-time operation of the software is compromised, making debugging and optimization of software that depends upon time-critical events difficult or impossible. Further, the amount of memory used to store monitored information can be considerable, impacting the compiled and running software.

Of particular interest in debugging software is the profiling of function calls. Function calls are instructions that transfer execution from a calling program to a called routine, possibly with data, which executes and then returns execution to the calling program, possibly returning results. Profiling refers to instrumenting the software so that the real-time behavior of the software can be measured and reported as the function call is executed. The called routine preferably resides on the same computer as the calling program but can reside on a different computer connected to the calling program computer. Profiling a function call by determining, for example, how often the function call is called and how long it takes to execute is difficult because the overhead involved in executing an inserted test-and-branch instruction upon calling and returning can create enough overhead to obscure information, such as execution times, of which it is desired to measure. In addition, the introduced overhead can disrupt the real-time nature of the software system being profiled and thereby reduce the amount of useful information that can be acquired.

Another issue with profiling or debugging systems is that introduction of debugging or profiling capabilities into source code can alter the operation of the software. Profiling instructions can be placed in locations that minimize the impact on system operation but still extract useful information. Once the software has been profiled, the profiling instructions can be removed from the code. While this can improve the operation of the software, it can also introduce additional unwanted behavior. At the very least the software needs to be re-tested and re-released due to the changes.

Embodiments of the methods and apparatuses disclosed herein profile code or a software application, preferably but not necessarily function calls, by inserting placeholder memory ranges at desired locations in a source code while compiling a binary object. Once compiled, code modification instructions that will modify the compiled binary object while it is being executed insert a call-trace profiling function call in at least one of the ranges, log call-trace profiling data using the function call and remove the function call. In such a way, an application can be instrumented for profiling so that the overhead is substantially undetectable when it is not being monitored. When the application is being monitored, the amount of memory used is minimized to reduce the impact of saving data in the program's memory space. Further, the application is instrumented for profiling in a way that does not require that the code be modified following profiling to return the source code to conditions for release as a product.

FIG. 1 is a schematic of a computer system 10 in which embodiments of the invention can be incorporated. An exemplary first station 12 can be, for example, a computer having an internal configuration of hardware including a processor such as a central processing unit (CPU) 14 and a memory 16. CPU 14 can be a controller for controlling the operations of first station 12. CPU 14 is connected to memory 16 by, for example, a memory bus (not shown). Memory 16 can be read-only memory (ROM), random access memory (RAM) or any other suitable memory device. Memory 16 stores data and program instructions that are used by CPU 14. Other suitable implementations of first station 12 are possible. For example, the processing of first station 12 can be distributed among multiple devices.

Figure 2:
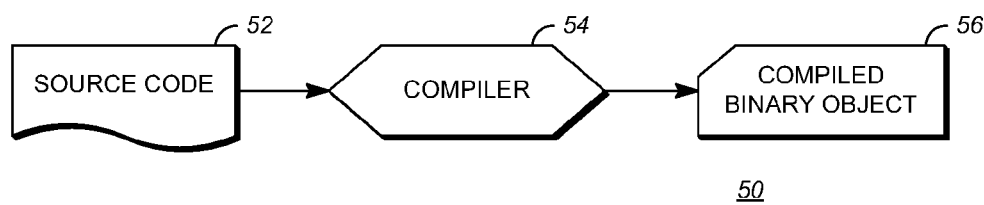
FIG. 2 is a schematic of a compiler incorporated in the computer system of FIG. 1.

First station 12 performs aspects of the invention by running a compiler. More specifically, FIG. 2 is a schematic of a compiler 54 incorporated in the computer system 10 of FIG. 1. Compiler 54 runs in CPU 14, where it reads a source code 52 from memory 16 and compiles it into a compiled binary object 56. Compiler 54 compiles source code 52 while including a plurality of placeholder memory ranges in compiled binary object 56. Each placeholder memory range is of a size suitable for inserting a call-trace profiling function call as described hereinafter. For example, the placeholder memory range could be a single 16-bit or 32-bit memory location or could be more memory locations.

It is desirable that the placeholder memory ranges result in a minimum of additional overhead in compiled binary object 56 over a compiled object without the placeholder memory ranges. That is, the placeholder memory ranges should be formed so as to make the runtime overhead due to including the placeholder memory ranges in compiled binary object 56 substantially undetectable.

In this present example, so-called "no operation" (NOP) instructions are inserted into the desired locations to form compiled binary object 56 by a compiler plug-in. NOP instructions are designed to have among the least overhead of any instruction that could be inserted into source code 52 during compilation. In one example, a one-cycle NOP instruction is inserted at the beginning of every function of a function call unless small and without loops and after the return instruction in every function in an executable binary. The invention is not limited to inserting NOP instructions to reserve placeholder memory. Other ways of forming the placeholder memory ranges are possible given the teachings of the present disclosure.

First station 12 also provides and optionally runs a set of code modification instructions as also described hereinafter.

An optional network 28 connects first station 12 and a second station 30. When first station 12 provides the set of code modification instructions to second station 30, the instructions can be transmitted from memory 16 of first station 12 over network 28 so as to be run by second station 30. Network 28 can, for example, be the Internet. Network 28 can also be a local area network (LAN), wide area network (WAN), virtual private network (VPN), cellular phone network or any other means of transferring the instructions from first station 12.

Second station 30, in one example, can be a computer having an internal configuration of hardware including a processor such as a central processing unit (CPU) 32 and a memory 34. CPU 32 can be a controller for controlling the operations of second station 30. CPU 32 can be connected to memory 34 by, for example, a memory bus (not shown). Memory 34 can be ROM, RAM or any other suitable memory device. Memory 34 stores data and program instructions that are used by CPU 32. Other suitable implementations of second station 30 are possible. For example, the processing of second station 30 can be distributed among multiple devices.

In FIG. 1, a display 36 configured to display a data or information can be connected to second station 30. In some implementations, second station 30 includes display 36. Display 36 can be implemented in various ways, including by a liquid crystal display (LCD) or a cathode-ray tube (CRT) or light emitting diode (LED) display, such as an OLED display.

Computer system 10 as shown is useful when function calls sent from one computer to another are to be monitored. Other implementations of computer system 10 are possible. For example, second station 30 can be omitted if the compiling and running of the code modification instructions are to be done on at a single station. One implementation can omit network 28 and/or display 36. In another implementation, a compiled binary object can be created and then stored for transmission at a later time with the set of code modifications describe previously. In another implementation, additional components can be added to computer system 10. For example, the set of code modification instructions described herein for one-demand call-trace profiling could be provided to a plurality of server computers.

Figure 3:
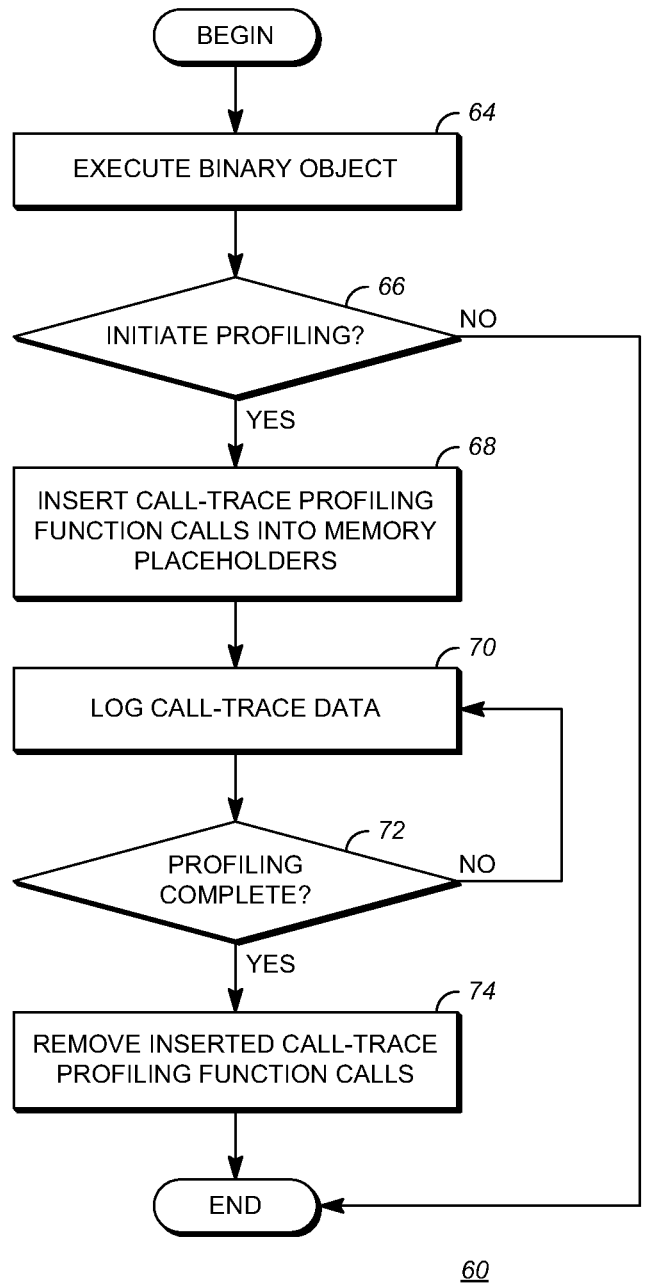
FIG. 3 is flowchart showing a call-trace profiling system according to an aspect of the invention.

FIG. 3 is flowchart showing a call-trace profiling system 60 according to an aspect of the invention. Beginning at step 64, compiled binary object 56 is executed. Before this, and as described previously with respect to FIGS. 1 and 2, compiler 54 generates compiled binary object 56 while reserving memory locations, called placeholder memory ranges herein, in source code 52. Optionally, compiler 54 also reserves memory locations in compiled binary object 56 to store logged profiling data obtained by call-trace profiling system 60.

If first station 12 executes compiled binary object 56, CPU 14 performs the processing of FIG. 3. If second station 12 executes compiled binary object 56, CPU 32 performs the processing of FIG. 3. Before or during execution of compiled binary object 56 in step 64, profiling for a particular location or locations in compiled binary object 56 can be initiated in step 66. That is, profiling can be initiated while the software to be debugged is running. Profiling can be initiated in step 66 by, for example, a user initiating a set of code modification instructions as part of call-trace profiling system 60. Alternatively, the system can listen to requests on a socket for instructions to begin or end profiling while the program is running. The code modification instructions either include or allow the user to input those locations of the placeholder memory ranges at which profiling should occur. If profiling is not initiated as indicated by the response to step 66, call-trace profiling system 60 ends operations without performing the subsequent set of code modification instructions. In this example, compiled binary object 56 executes with the NOP instructions in place.

After profiling is initiated (a "yes" response at step 66), call-trace profiling system 60 inserts a call-trace profiling function call into each placeholder memory range indicated by the user or the locations pre-programmed in the code modification instructions. In the example discussed, this is done by replacing one or more NOP instructions at the placeholder memory range with a call-trace function call. Each time CPU 14 or CPU 32 executes sections of the compiled binary object 56 containing an inserted call-trace function call, control is transferred (or branches) to a logging routine in step 70 that logs call-trace data, preferably in an in-memory buffer provided by compiler 54 in compiled binary object 56 according to known techniques. Alternatively, CPU 14 or CPU 32 can log call-trace data to RAM, for example.

The call-trace data can include a variety of information. For example, the call-trace data can include data such as a function identifier, values of arguments to the function, values of global variables and call time. When the tracing period is over for each call-trace function call (i.e., the profiling is complete) in step 72, the buffers are logged to memory 16 or memory 34, whichever is applicable, preferably with compression. This can be from user input or when a predetermined limit within the code modification instructions has been reached. Then, in step 74, the inserted call-trace profiling function calls are removed. In this example, they are converted back to NOP instructions.

Several compression techniques can be used to allow a reduction in the size of the traces. In one example, a compact 8-byte format for each record using a few bits for the function identifier, a few bits of metadata and a few bits for timing information at microsecond granularity can be used. In addition or alternatively thereto, a filter that dynamically checks for function calls that are less than a threshold (5 microseconds) and discards those records can be used. A second compression that uses delta encoding to record just the difference in time from the start of a block can be used along with an optional third compression pass that uses a standard compression library to further reduce the size of the trace file.

The logs can be processed on a separate machine to reconstruct the call-graph trace by decompressing the logs and mapping the function identifiers using a map that is stored in a separate persistent store. In this way, the logged data is analyzed to reveal details of the software operation. For function calls, for example, statistics such as latency, duration, maximum execution time, minimum execution time, average execution time and distribution of execution times can be analyzed.

In operation, when it is desired to profile an application such as a function call at runtime, instructions are inserted into at least some of the placeholder memory ranges in compiled binary code 56 that direct the CPU 12 or CPU 32 to branch to a location that saves desired information, such as the time the function was called. Later, when the function call returns, another inserted instruction that has been placed at the return point of the calling program measures the time the function call returns, among other data. Memory used to store the data is typically set aside by compiler 54 in compiled binary code 56 at the time of compiling. In order to minimize the impact of the collected data on the running program, the data may be compressed before storing in memory 14 or 34, thereby minimizing the storage requirements for the profile information. In this way, the profiled software does not have to be modified further following profiling before release.

The effect of adding the placeholder memory ranges to the code is negligible, so the ranges can be left in the code if not used for a trace without significantly affecting the real-time operation of the software. In addition, if at some future time it is desired to profile the software due to some change in the system or environment, all or some of the placeholder memory ranges can be replaced with profiling instructions so as to profile the software without re-compiling.

FIG. 4A is a segment of a prior art compiled binary object that shows memory locations with exemplary assembly language instructions. More specifically, FIG. 4A is a segment 80 of a compiled binary object for an example code segment for a function call named "Function_A" that shows memory locations ADDR1 through ADDRN with stored example assembly language instructions. Memory location ADDR1 represents the entry point for Function_A where execution would be transferred from a calling routine. At memory location ADDR1, a MOV instruction moves a constant CONST into register A. Following this, one or more instructions may be executed as represented by the ellipsis. Upon completion of these instructions at ADDRN, Function_A returns to the calling routine by executing the RET instruction.

FIG. 4B is a segment 82 of a compiled binary object 56 compiled according to an aspect of the invention including NOP instructions. In this segment 82, compiler 54 inserts NOP instructions into the instruction stream of Function_A as shown at memory locations ADDR1 and ADDRN+k1, where k1 is a constant representing the number of bytes required to encode a NOP instruction. This code will execute substantially similar to and at substantially the same rate as the code shown in FIG. 4A, with the additional overhead associated with the NOP instructions at ADDR1 and ADDRN+k2, where k2 is a constant representing the number of bytes required to encode a RET instruction. In general, a NOP instruction adds the least amount of overhead possible, since CPU 14 or 34 does not have to move or change any data and typically only has to update the program counter when executing a NOP instruction.

FIG. 4C is a segment 84 of the compiled binary object 56 of FIG. 4B following substitution of call trace profiling instructions for the NOP instructions. Specifically, the function call instruction CALL TRACE_PROF_ENTRY is substituted at ADDR1 for the NOP instruction of FIG. 4B. This instruction causes CPU 14 or 34 to branch to a routine that gathers the profile data and stores it in memory 16 or 36 before returning to execute the function call at ADDR1+k1. The function call Function_A then executes instructions exactly as in FIGS. 4A and 4B until reaching ADDRN. Instead of returning to the calling routine, Function_A executes a JMP instruction that transfers execution back to the trace profiling routine at TRACE_PROF_EXIT. The trace profiling routine desirably calculates and stores the desired trace information and returns directly to the calling routine without first returning to Function_A, thereby saving an additional RET instruction. This is not necessary, however. When profiling stops, the CALL TRACE_PROF_ENTRY instruction at ADDR1 is replaced with a NOP instruction and the JMP TRACE_PROFILE_EXIT instruction at ADDRN is replaced with a NOP instruction and a RET instruction to restore segment 84 to its previous state as shown by segment 82 in FIG. 4B.

It should be noted that the memory addresses shown in the example of FIGS. 4A-4C are based on instructions from a compiler that generates variable length instructions. Examples using different compilers and instruction sets may differ in that the number of bytes required to store a particular instruction may vary but the general principles remain the same. As seen in FIG. 4C, for example, a one-byte RET instruction plus a four-byte NOP instruction can be replaced by a five-byte JMP instruction in memory, demonstrating that a call-trace profiling function inserted into a placeholder memory range can also replace other instructions if desirable.

Referring again to FIG. 1, compiled binary object 56 may be executed on CPU 14 of first station 12, while the actual function accessed by a function call may either reside on the same first station 12 as compiled binary object 56 as a local function call or reside on second station 30 connected to first station 12 by network 28, in which case it may be called a remote procedure call. For example, a function call coming from first station 12 may be sent to second station 30 to display information 38 on display 36. Debugging code in this fashion allows computer system 10 to operate substantially as if no debugging code was installed, therefore revealing aspects of operation of computer system 10 that may be best revealed under actual operating conditions.

Another aspect of the invention is that the logged data can be compressed as it is acquired and stored in memory 16 or 36 to minimize the amount of memory required to store the data. This allows call-trace profiling system 60 to store more data than if it were uncompressed while minimizing the impact on compiled binary object 56.

The embodiments of first station 12 and/or second station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of first station 12 and second station 30 do not necessarily have to be implemented in the same manner, and second station 30 can be omitted as previously described.

Further, in one embodiment, for example, first station 12 or second station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for on-demand call-trace profiling an application having source code to be executed on a system, the method comprising:
    compiling a binary object from the source code using a processor while including a plurality of placeholder memory ranges in the compiled binary object, each placeholder memory range being of a size suitable for inserting a call-trace profiling function call and each placeholder memory range including a no operation (NOP) instruction; and
    providing a set of code modification instructions configured to modify the compiled binary object while it is being executed, the instructions including:
    inserting a call to a first call-trace profiling function in at least one of the plurality of placeholder memory ranges in place of the NOP instruction;
    replacing a return instruction and a subsequent NOP instruction with a jump instruction associated with a call to a second call-trace profiling function;
    logging call-trace profiling data using the inserted call-trace profiling function calls;
    and removing the inserted call-trace profiling function call after logging the call-trace profiling data including replacing the removed call-trace profiling function call with the NOP instruction and replacing the jump instruction with the return instruction and the subsequent NOP instruction.

2. The method of claim 1 wherein a runtime overhead due to including the plurality of placeholder memory ranges in the compiled binary object is substantially undetectable as compared to that of the source code compiled without including the plurality of placeholder memory ranges.

3. The method of claim 1 wherein the compiled binary object comprises at least one remote procedure call.

4. The method of claim 3 wherein the compiled binary object includes a first one of the plurality of placeholder memory ranges adjacent an address of the at least one remote procedure call and a second one of the plurality of placeholder memory ranges adjacent a return point of the at least one remote procedure call.

5. A method of on-demand call-trace profiling an application having source code to be executed on a system, the method comprising:
    inserting, while executing a compiled binary object, a call to a first call-trace profiling function in at least one of a plurality of placeholder memory ranges included in the compiled binary object, the compiled binary object compiled from the source code and stored in a memory and each placeholder memory range being of a size suitable for the inserted call-trace profiling function call and including a NOP instruction inserted during compilation of the compiled binary object, wherein inserting the call-trace profiling function call comprises replacing the NOP function in the at least one of the plurality of placeholder memory ranges with a respective call-trace profiling function call and replacing a return instruction and a subsequent NOP instruction with a jump instruction associated with a call to a second call-trace profiling function;

logging call-trace profiling data using the inserted call-trace profiling function calls; and removing the inserted call-trace profiling function call after logging the call-trace profiling data including replacing the removed call-trace profiling function call with the NOP function and replacing the jump instruction with the return instruction and the subsequent NOP instruction.

6. The method of claim 5 wherein a runtime overhead due to executing the inserted call-trace profiling function is small enough to permit normal operation of the compiled binary object while it is being executed as compared to executing the source code compiled without the plurality of placeholder memory ranges.

7. The method of claim 5, further comprising:
compressing the call-trace profiling data to minimize data storage requirements.

8. The method of claim 5 wherein the inserted call-trace profiling function call comprises a function call.

9. The method of claim 5 wherein the call-tracer profiling data comprises a function identifier and a time.

10. An apparatus for on-demand call-trace profiling an application having source code to be executed on a system, the apparatus comprising:
a memory; and
a processor configured to execute instructions stored in the memory to:
insert, while executing the compiled binary object, a call to a first call-trace profiling function in at least one of a plurality of placeholder memory ranges included in a compiled binary object, the compiled binary object compiled from the source code and stored in a memory and each placeholder memory range being of a size suitable for the inserted call-trace profiling function call and including a NOP instruction inserted during compilation of the compiled binary object, wherein the processor is configured to insert the call-trace profiling function call by replacing the NOP function in the at least one of the plurality of placeholder memory ranges with a respective call-trace profiling function call and replacing a return instruction and a subsequent NOP instruction with a jump instruction associated with a call to a second call-trace profiling function;

log call-trace profiling data using the inserted call-trace profiling function calls; and remove the inserted call-trace profiling function call after logging the call-trace profiling data including replacing the removed call-trace profiling function call with the NOP function and replacing the jump instruction with the return instruction and the subsequent NOP instruction.

11. The apparatus of claim 10 wherein the processor is configured to compile the compiled binary object from the source code while including the plurality of placeholder memory ranges in the compiled binary object.

12. The apparatus of claim 10 wherein the processor is configured to insert the call-trace profiling function call by inserting a respective call-trace profiling function in at least two of the plurality of placeholder memory ranges.

13. The apparatus of claim 10 wherein a runtime overhead of the plurality of placeholder memory ranges in the compiled binary object is substantially undetectable.

14. The apparatus of claim 10 wherein the processor is further configured to compress the call-trace profiling data.

15. The apparatus of claim 14 wherein the call trace-profiling data comprises a function identifier and a time.

16. A method for on-demand call-trace profiling an application having source code to be executed on a system, the method comprising:
compiling a binary object from the source code using a processor while including a plurality of NOP functions in the compiled binary object, each NOP function defining a placeholder memory range of a size suitable for inserting a call-trace profiling function call; and
providing a set of code modification instructions configured to modify the compiled binary object while it is being executed, the instructions including:
replacing at least one of the NOP functions with a call to a first call-trace profiling function;
replacing a return instruction and a subsequent NOP instruction with a jump instruction associated with a call to a second call-trace profiling function;
logging call-trace profiling data using the inserted call-trace profiling function calls; and
subsequent to logging call-trace profiling data, removing the inserted call-trace profiling function call and restoring the NOP function and replacing the jump instruction with the return instruction and the subsequent NOP instruction.

* * * * *